(12) United States Patent
He et al.

(10) Patent No.: US 11,392,787 B2
(45) Date of Patent: Jul. 19, 2022

(54) METHOD FOR GRASPING TEXTURE-LESS METAL PARTS BASED ON BOLD IMAGE MATCHING

(71) Applicant: ZHEJIANG UNIVERSITY, Hangzhou (CN)

(72) Inventors: Zaixing He, Hangzhou (CN); Xinyue Zhao, Hangzhou (CN); Zhiwei Jiang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/276,814

(22) PCT Filed: Dec. 27, 2019

(86) PCT No.: PCT/CN2019/128936
§ 371 (c)(1),
(2) Date: Mar. 16, 2021

(87) PCT Pub. No.: WO2020/151454
PCT Pub. Date: Jul. 30, 2020

(65) Prior Publication Data
US 2021/0271920 A1    Sep. 2, 2021

(30) Foreign Application Priority Data

Jan. 23, 2019  (CN) .......................... 201910064184.0

(51) Int. Cl.
*G06K 9/62*   (2022.01)
*B25J 15/00*  (2006.01)
*G06K 9/00*   (2022.01)

(52) U.S. Cl.
CPC ........ *G06K 9/6201* (2013.01); *B25J 15/0033* (2013.01); *G06K 9/00536* (2013.01)

(58) Field of Classification Search
None
See application file for complete search history.

(56) References Cited

U.S. PATENT DOCUMENTS

2015/0363663 A1* 12/2015 Tombari ............... G06V 10/255
                                                       382/170
2018/0314909 A1   11/2018 Brendel

OTHER PUBLICATIONS

Tombari, Federico, Alessandro Franchi, and Luigi Di Stefano. "BOLD features to detect texture-less objects." Proceedings of the IEEE International Conference on Computer Vision. 2013. (Year: 2013).*

* cited by examiner

*Primary Examiner* — David Perlman
(74) *Attorney, Agent, or Firm* — Jiwen Chen; Jacobson Holman PLLC

(57) ABSTRACT

A method for grasping texture-less metal parts based on BOLD image matching comprises: obtaining a real image and CAD template images by photographing, extracting a foreground part of the input part image, calculating a covariance matrix of a foreground image, establishing the direction of a temporary coordinate system, and setting directions of line segments to point to a first or second quadrant of the temporary coordinate system; constructing a descriptor of each line segment according to an angle relation between the line segment and k nearest line segments, and matching the descriptors of different line segments in the real image and the CAD template images to obtain line segment pairs; and recognizing a processed pose through a PNL algorithm to obtain a pose of a real texture-less metal part, and then inputting the pose of the real texture-less metal part to a mechanical arm to grasp the part. The present invention can correctly match line segments, obtain an accurate pose of the (Continued)

part by calculation, successfully grasp the part, and satisfy actual application requirements.

7 Claims, 3 Drawing Sheets

METHOD FOR GRASPING TEXTURE-LESS METAL PARTS BASED ON BOLD IMAGE MATCHING

This is a U.S. national stage application of PCT Application No. PCT/CN2019/128936 under 35 U.S.C. 371, filed Dec. 27, 2019 in Chinese, claiming priority to Chinese Patent Application No. 201910064184.0, filed Jan. 23, 2019, all of which are hereby incorporated by reference.

BACKGROUND OF THE INVENTION

1. Technical Field

The present invention relates to the technical field of computer vision and industrial automation, in particular to a method for grasping texture-less metal parts based on contrast-invariant bunch of lines descriptor image matching.

2. Description of Related Art

Grasping of texture-less metal parts has always been an important research interest in the field of computer vision and industrial automation, and is required in many application scenarios such as part recognition.

The most common method for grasping textured objects is to extract and then match feature points (such as SIFT (scale-invariant feature transform) or SURF (speeded up robust features)) in templates and real images, and is high in efficiency and accurate. However, this method is not suitable for texture-less metal parts the valid feature points of which cannot be extracted.

Most existing matching-based texture-less part grasping method are typically implemented as follows: part contours in real part images are extracted and compared with template contours, the most similar template is used as a correctly matched template, and grasping is carried out according to the pose corresponding to this template. The common methods include: directly comparing corresponding pixels of two contour images (the template image and the real image); or, extracting some features (such as moment features) of the two contour images to calculate the similarity of the features. However, all these methods calculate the contours as a whole and may be influenced by external factors; the calculation complicity is high, the matching accuracy is low, and the final success rate of grasping is affected.

In recent years, some scholars have put forward a method for matching and grasping texture-less objects by means of adjacent line segments (Bundle Of Lines Descriptor, BOLD). This descriptor-based matching method can accurately complete line segment matching of images, is robust to rotation, horizontal movements and scale variations, and can obtain results satisfying grasping precision to complete grasping. However, due to the BOLD's requirement for a description of line segments in the gradient direction, the BOLDs cannot be accurately matched in case of a change to the image contrast, thus resulting in a grasping failure.

BRIEF SUMMARY OF THE INVENTION

To overcome the defects of the aforesaid matching methods, the present invention provides a method for grasping texture-less metal parts based on BOLD image matching. The present invention puts forward a novel line segment direction definition method and improves the calculation method of distance functions for matching, thus being suitable for more general conditions and satisfying actual application requirements.

As shown in FIG. 1, the technical solution of the present invention comprises the following steps:

Step 1: photographing a real texture-less metal part placed in a real environment by a real physical camera to obtain a real image; photographing a texture-less metal part CAD model imported in a computer virtual scene by a virtual camera to obtain CAD template images; extracting a foreground part of the input real image and the input CAD template images, calculating a covariance matrix of the foreground part, and establishing the direction of a temporary coordinate system;

Wherein, the CAD model is a network model such as a triangular mesh.

Step 2: processing the real image and all the CAD template images by means of a line segment detector (LSD), extracting edges in the real image and all the CAD template images and using the edges as line segments, traversing all the line segments in each image, and setting directions of the line segments in the temporary coordinate system;

Step 3: for each image, traversing all the line segments, and constructing a descriptor of each line segment according to an angle relation between the line segment and k nearest line segments;

Step 4: in case of different k values for the descriptors of the line segments in the real image and the CAD template images, matching the descriptors of different line segments in the real image and the CAD template images to obtain line segment pairs; and Step 5: recognizing a processed pose by means of perspective n lines (PNL) according to matched line segment pairs to obtain a pose of the real texture-less metal part, and then inputting the pose of the real texture-less metal part into a mechanical arm to grasp the part.

The texture-less metal part is a polyhedral metal part with a flat and smooth surface and free of pits, protrusions and textures.

Specifically, in Step 1, the foreground part of the images is extracted and used as a foreground image, a covariance matrix of the foreground image is calculated to obtain two feature values of the covariance matrix and feature vectors corresponding to the two feature values, the feature vector corresponding to a larger feature value is taken as an x-axis positive direction of the temporary coordinate system, and the other feature vector is taken as a y-axis positive direction of the temporary coordinate system.

Traversing all the line segments to set directions of the line segments in Step 2 is performed specifically as follows: a temporary coordinate system is established with any point on each line segment as the origin of the temporary coordinate system; then, if the line segment passes through a first quadrant, the line segment points to the first quadrant of the temporary coordinate system; if the line segment passes through a second quadrant, the line segment points to the second quadrant of the temporary coordinate system; or, if the line segment does not pass through the first quadrant or the second quadrant, the line segment points to the first quadrant and the second quadrant of the temporary coordinate system.

In Step 3, the k nearest line segments of each line segment are selected in order according to the distances between midpoints of the line segments. That is, for each line segment, the distances between the midpoint of this line segment and the midpoints of all the other line segments are calculated, and k line segments with shortest distances are selected as the k nearest line segments.

k values for the line segments in each image are identical, and k values for the line segments in different images may be identical or different.

Specifically, in Step 3:

3.1: with two line segments $s_i$ and $s_j$ as one line segment and one nearest line segment thereof, a first angle $\alpha$ and a second angle $\beta$ are calculated according to the following formula, as shown in FIG. 3, and relative positions of the two line segments $s_i$ and $s_j$ are described by $\alpha$ and $\beta$;

$$\alpha = \begin{cases} \arccos\left(\frac{s_i \cdot t_{ij}}{\|s_i\| \cdot \|t_{ij}\|}\right), \frac{s_i \times t_{ij}}{\|s_i \times t_{ij}\|} \cdot n = 1 \\ 2\pi - \arccos\left(\frac{s_i \cdot t_{ij}}{\|s_i\| \cdot \|t_{ij}\|}\right), \text{else} \end{cases}$$

$$\beta = \begin{cases} \arccos\left(\frac{s_j \cdot t_{ji}}{\|s_j\| \cdot \|t_{ji}\|}\right), \frac{s_j \times t_{ji}}{\|s_j \times t_{ji}\|} \cdot n = 1 \\ 2\pi - \arccos\left(\frac{s_j \cdot t_{ji}}{\|s_j\| \cdot \|t_{ji}\|}\right), \text{else} \end{cases}$$

$$\begin{cases} t_{ij} = m_j - m_i \\ t_{ji} = m_i - m_j \end{cases}$$

wherein, $s_i$ and $s_j$ are vector representations of two line segments in the same image, respectively, and vector directions are determined by the directions of the line segments in the temporary coordinate system obtain in Step 2; n is a unit vector perpendicular to an image plane, $\|a\|$ represents the module length of a vector a, $m_i$ and $m_j$ represent midpoints of the line segments $s_i$ and $s_j$, respectively, and $t_{ij}$ represents a vector that points from $m_i$ to $m_j$.

3.2: for each line segment of the images, the first angles $\alpha$ and the second angles $\beta$ between the line segment and k nearest line segments are obtained according to Step 3.1, that is, a constant contrast-based BOLD of each line segment is constructed by k pairs of first angles $\alpha$ and second angles $\beta$, which form a matrix to represent the descriptor.

In actual implementation, each pair of first angle $\alpha$ and second angle $\beta$ can be discretely accumulated into a 2D joint histogram, and in this specification, the discrete step length is set to $\pi/12$, and the 2D joint histogram is the descriptor of the line segment.

Specifically, in Step 4:

4.1: different k values for generating the descriptors of the line segments in the real image and the CAD template images are $k_1$ and $k_2$, respectively;

If $k_1 = k_2$, the Euclidean distance between the descriptor of one line segment in the real image and the descriptor of each line segment in the CAD template images is calculated according to the following formula, two line segments corresponding to the nearest descriptors are selected and are regarded as matched to constitute a line segment pair:

$$d = \sqrt{\sum_{i=1}^{n} (d_i^1 - d_i^2)^2}$$

wherein, d is the Euclidean distance between two descriptors, $d_i^1$ is the i-th element in the descriptor of the line segment in a first image, $d_i^2$ is the i-th element in the descriptor of the line segment in a second image, i is the ordinal of elements in the descriptor, and n is the total number of elements in the descriptor;

If $k_1 < k_2$, processing is performed as follows:

First, the descriptor of each image is calculated and corrected according to the following formula:

$$d_i^2 = \begin{cases} 0, d_i^1 = 0 \\ d_i^2, \text{else} \end{cases}, i = 1, 2 \ldots n$$

wherein, $d_i^m$ is an element at the i-th position of the line segment in an m-th image, Then, the descriptors of all the images are normalized:

$$d_i^m = \frac{d_i^m}{\sqrt{\sum_{i=1}^{n} (d_i^m)^2}}, m = 1, 2$$

wherein, m is the descriptor of the line segment in one image and is 1 or 2. When k=1, m=1, and when k=2, m=2.

Finally, the Euclidean distance between the descriptor of one line segment in the real image and the descriptor of each line segment in the CAD template images is calculated according to the following formula, and two line segments corresponding to the nearest descriptors are selected and are regarded as matched:

$$d = \sqrt{\sum_{i=1}^{n} (d_i^1 - d_i^2)^2}$$

wherein, d is the Euclidean distance between two descriptors, $d_i^1$ is the i-th element in the descriptor of the line segment in a first image, $d_i^2$ is the i-th element in the descriptor of the line segment in a second image, i is the ordinal of elements in the descriptor, and n is the total number of elements in the descriptor;

Finally, in Step 4, after line segment pairs of all the line segments in the real image are found in the CAD template images, mismatches of all the line segments are removed by means of RANSAC (random sample consensus), and a finally obtained line segment pair is used as a line segment matching result.

The present invention has the following beneficial effects:

1) The present invention solves the problem of mismatches of texture-less metal parts caused by the variation of the background contrast.

2) The present invention improves the calculation method of distance functions for matching, so that the calculation method can adapt to different k values and can satisfy actual application requirements.

3) The present invention solves the problem that accurate matching of parts cannot be realized when the random illumination and part pose change, and can calculate the poses of parts in an industrial environment more robustly and accurately, thus greatly improving the success rate of part grasping.

DETAILED DESCRIPTION OF THE INVENTION

Figure 1:
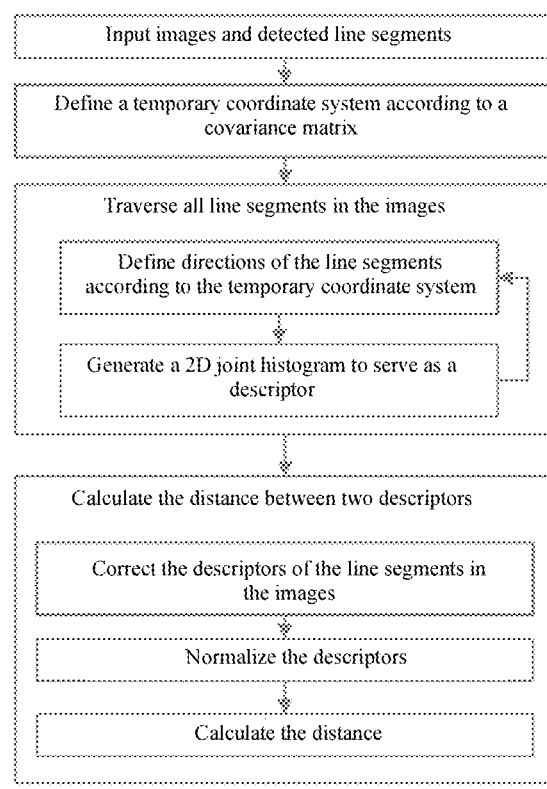
FIG. 1 is a flow diagram of a method of the present invention.

The present invention will be further explained below in conjunction with the accompanying drawings and embodiments. The flow diagram of the present invention is illustrated by FIG. 1.

A specific embodiment and an implementation process thereof of the present invention are as follows:

This embodiment is implemented with a U-shaped bolt as a texture-less metal part.

Step 1: a real texture-less metal part placed in a real environment is photographed by a real physical camera to obtain a real image; a texture-less metal part CAD model imported in a computer virtual scene is photographed by a virtual camera to obtain CAD template images; a foreground part of the input real image and the input CAD template images is extracted through a grabcut algorithm, a covariance matrix of the foreground part is calculated, and the direction of a temporary coordinate system is established.

Figure 2:
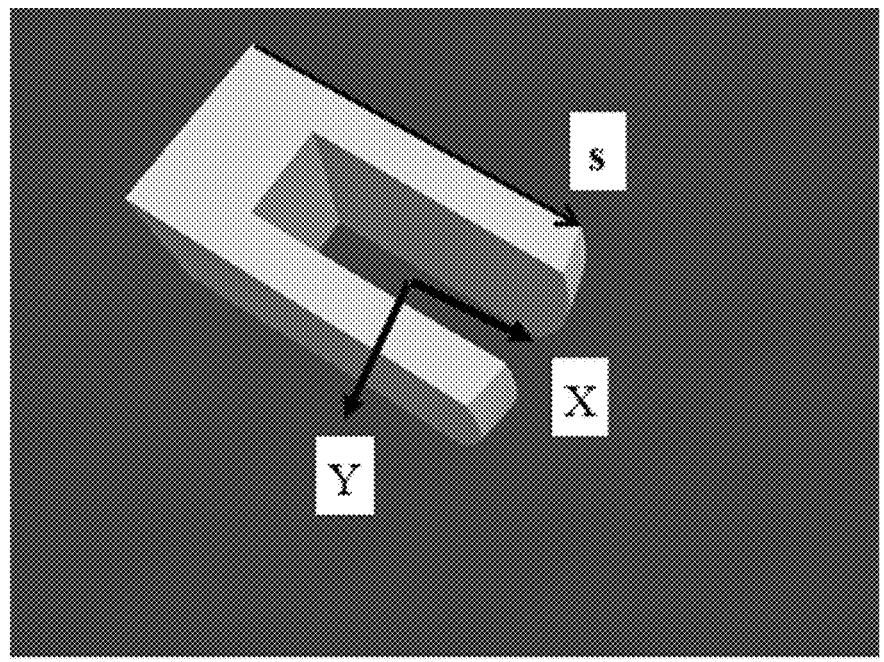
FIG. 2 is a schematic diagram for direction definition of line segments.

The real image and the CAD template images are specifically processed as follows: a covariance matrix of a foreground image of an input image, feature values thereof, and corresponding vector features are calculated, the feature vector corresponding to a larger feature value is taken as an x-axis positive direction of the temporary coordinate system, and the other feature vector is taken as a y-axis positive direction of the temporary coordinate system, as shown in FIG. 2.

Step 2: the real image and all the CAD template images are processed by means of a line segment detector (LSD), edges in the real image and all the CAD template images are extracted and used as line segments, all the line segments in each image are traversed, and directions of the line segments in the temporary coordinate system are set.

As shown in FIG. 2, the direction of the line segment s is set to point to a first quadrant of the temporary coordinate system.

Figure 3:
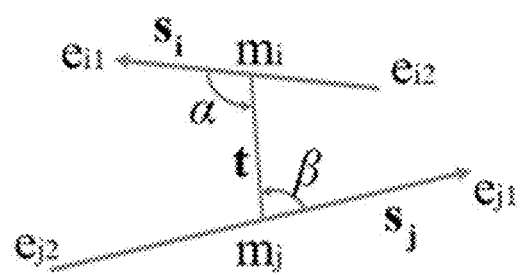
FIG. 3 is a schematic diagram of descriptor calculation.

Step 3: for each image, all the line segments are traversed, and a descriptor of each line segment is constructed according to an angle relation between the line segment and k nearest line segments;

As shown in FIG. 3, specifically:

3.1: with two line segments $s_i$ and $s_j$ as one line segment and a nearest line segment thereof, a first angle $\alpha$ and a second angle $\beta$ are calculated according to the following formula, as shown in FIG. 3, and relative positions of the two line segments $s_i$ and $s_j$ are described by $\alpha$ and $\beta$;

$$\alpha = \begin{cases} \arccos\left(\frac{s_i \cdot t_{ij}}{\|s_i\| \cdot \|t_{ij}\|}\right), \frac{s_i \times t_{ij}}{\|s_i \times t_{ij}\|} \cdot n = 1 \\ 2\pi - \arccos\left(\frac{s_i \cdot t_{ij}}{\|s_i\| \cdot \|t_{ij}\|}\right), \text{else} \end{cases}$$

$$\beta = \begin{cases} \arccos\left(\frac{s_j \cdot t_{ji}}{\|s_j\| \cdot \|t_{ji}\|}\right), \frac{s_j \times t_{ji}}{\|s_j \times t_{ji}\|} \cdot n = 1 \\ 2\pi - \arccos\left(\frac{s_j \cdot t_{ji}}{\|s_j\| \cdot \|t_{ji}\|}\right), \text{else} \end{cases}$$

$$\begin{cases} t_{ij} = m_j - m_i \\ t_{ji} = m_i - m_j \end{cases}$$

3.2: for each line segment in the images, the first angles $\alpha$ and the second angles $\beta$ of the line segment and k nearest line segments are obtained according to Step 3.1, that is, a constant contrast-based BOLD of each line segment is constructed by k pairs of first angles $\alpha$ and second angles $\beta$, which form a matrix to represent the descriptor.

In actual implementation, each pair of first angle $\alpha$ and second angle $\beta$ can be discretely accumulated into a 2D joint histogram, and in this specification, the discrete step length is set to $\pi/12$, and the 2D joint histogram is the descriptor of the line segment.

Figure 4:
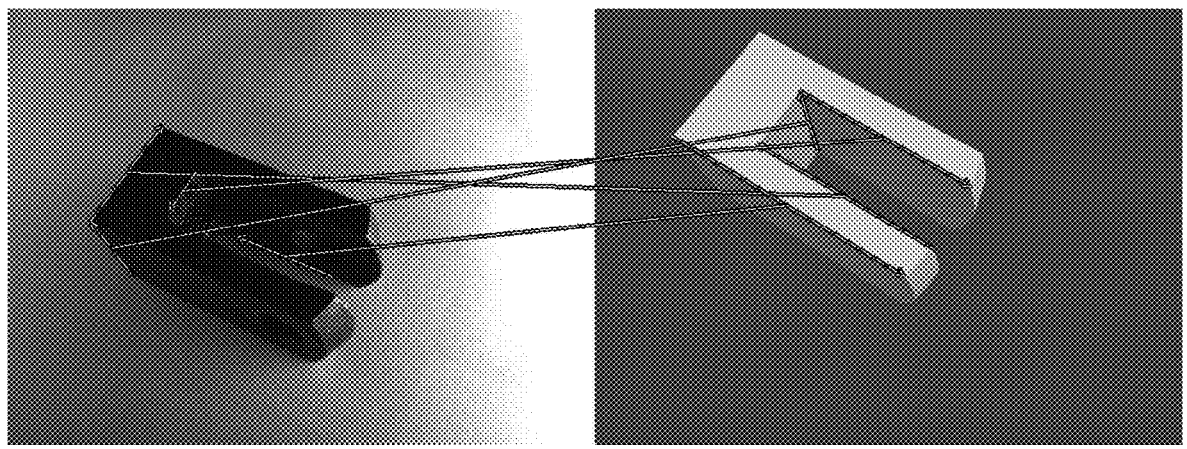
FIG. 4 is a diagram of a matching result obtained by applying BOLD to a texture-less metal part.
Figure 5:
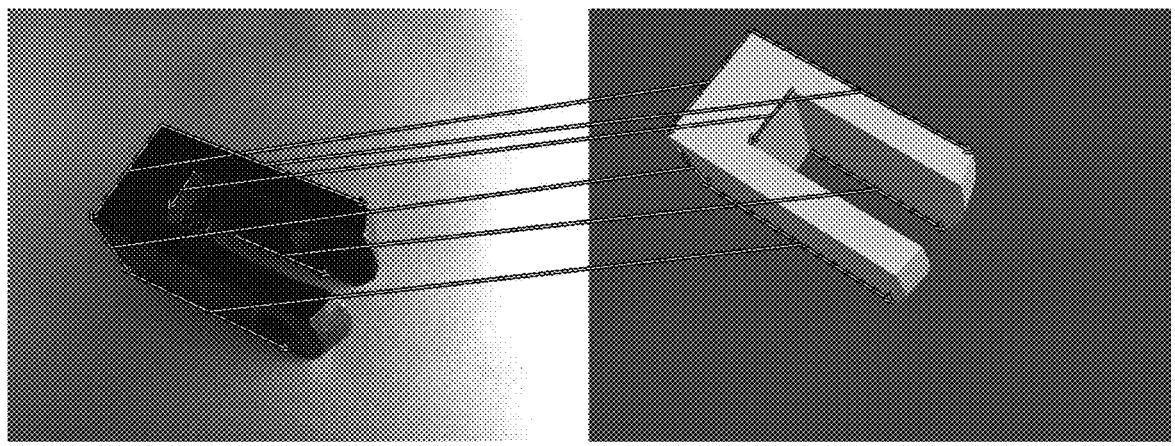
FIG. 5 is a diagram of a matching result obtained by applying the present invention to a texture-less metal part.

Step 4: in case of different k values for generating the descriptors of line segments in the real image and the CAD template images, the descriptors of different line segments in the real image and the CAD template images are matched to obtain line segment pairs;

Finally, mismatches are removed through an RANSAC algorithm, an output matching result is shown in FIG. 5, and correctly matched line segments are indicated by boxes. A matching result obtained by BOLD is shown in FIG. 4. As can be seen, the method of the present invention greatly improves the accuracy.

Step 5: a processed pose is recognized by means of perspective n lines (PNL) according to the matched line segment pairs to obtain a pose of the real texture-less metal part, and then the pose of the real texture-less metal part is input to a mechanical arm to grasp the part.

The preferred embodiments mentioned above are used to disclose the present invention, and are not intended to limit the present invention. Those ordinarily skilled in the art can make different modifications and embellishments without departing from the spirit and scope of the present invention. Therefore, the protection scope of the present invention is defined by the claims.

What is claimed is:

1. A method for grasping texture-less metal parts based on bundle of lines descriptor (BOLD) image matching, comprising the steps of:

step 1: photographing a real texture-less metal part placed in a real environment by a real physical camera to obtain a real image; photographing a texture-less metal part computer aided design (CAD) model imported in a computer virtual scene by a virtual camera to obtain CAD template images; extracting a foreground part of the input real image and the input CAD template images, calculating a covariance matrix of the foreground part, and establishing a direction of a temporary coordinate system;

step 2: processing the real image and all the CAD template images by means of a line segment detector, extracting edges in the real image and all the CAD template images and using the edges as line segments, traversing all the line segments in each said image, and setting directions of the line segments in the temporary coordinate system;

step 3: for each said image, traversing all the line segments, and constructing a descriptor of each said line segment according to an angle relation between the line segment and k nearest line segments;

step 4: in case of different k values of the descriptors k of the line segments in the real image and the CAD template images, matching the descriptors of different line segments in the real image and the CAD template images to obtain line segment pairs; and step 5: recognizing a processed pose by means of perspective n lines according to the matched line segment pairs to obtain a pose of the real texture-less metal part, and then inputting the pose of the real texture-less metal part into a mechanical arm to grasp the part.

2. The method for grasping texture-less metal parts based on BOLD image matching according to claim 1, wherein the texture-less metal part is a polyhedral metal part with a flat and smooth surface and free of pits, protrusions and textures.

3. The method for grasping texture-less metal parts based on BOLD image matching according to claim 1, wherein specifically, in Step 1, the foreground part of the images is extracted and used as a foreground image, a covariance matrix of the foreground image is calculated to obtain two feature values of the covariance matrix and feature vectors corresponding to the two feature values, the feature vector corresponding to a larger feature value is taken as an x-axis positive direction of the temporary coordinate system, and the other feature vector is taken as a y-axis positive direction of the temporary coordinate system.

4. The method for grasping texture-less metal parts based on BOLD image matching according to claim 1, wherein traversing all the line segments to set directions of the line segments in the step 2 is performed specifically as follows: a temporary coordinate system is established with any point on each said line segment as an origin of the temporary coordinate system; if the line segment passes through a first quadrant, the line segment points to the first quadrant of the temporary coordinate system; then: if the line segment passes through a second quadrant, the line segment points to the second quadrant of the temporary coordinate system; or, if the line segment does not pass through the first quadrant or the second quadrant, the line segment points to the first quadrant and the second quadrant of the temporary coordinate system.

5. The method for grasping texture-less metal parts based on BOLD image matching according to claim 1, wherein in the step 3, the k nearest line segments of each said line segment are selected in order according to distances between midpoints of the line segments.

6. The method for grasping texture-less metal parts based on BOLD image matching according to claim 1, wherein the step 3 is performed specifically as follows:

3.1: with two line segments $s_i$ and $s_j$ as one line segment and one nearest line segment thereof, a first angle $\alpha$ and a second angle $\beta$ are calculated according to the following formula, and relative positions of the two line segments $s_i$ and $s_j$ are described by $\alpha$ and $\beta$;

$$\alpha = \begin{cases} \arccos\left(\dfrac{s_i \cdot t_{ij}}{\|s_i\| \cdot \|t_{ij}\|}\right), \dfrac{s_i \times t_{ij}}{\|s_i \times t_{ij}\|} \cdot n = 1 \\ 2\pi - \arccos\left(\dfrac{s_i \cdot t_{ij}}{\|s_i\| \cdot \|t_{ij}\|}\right), \text{else} \end{cases}$$

$$\beta = \begin{cases} \arccos\left(\dfrac{s_j \cdot t_{ji}}{\|s_j\| \cdot \|t_{ji}\|}\right), \dfrac{s_j \times t_{ji}}{\|s_j \times t_{ji}\|} \cdot n = 1 \\ 2\pi - \arccos\left(\dfrac{s_j \cdot t_{ji}}{\|s_j\| \cdot \|t_{ji}\|}\right), \text{else} \end{cases}$$

$$\begin{cases} t_{ij} = m_j - m_i \\ t_{ji} = m_i - m_j \end{cases}$$

wherein, $s_i$ and $s_j$ are vector representations of two line segments in the same image, respectively, and vector directions are determined by the directions of the line segments in the temporary coordinate system obtain in Step 2; n is a unit vector perpendicular to an image plane, $\|a\|$ is a module length of a vector a, $m_i$ and $m_j$ are midpoints of the line segments $s_i$ and $s_j$, respectively, and $t_{ij}$ is a vector that points from $m_i$ to $m_j$;

3.2: for each said line segment in the images, the first angles $\alpha$ and the second angles $\beta$ of the line segment and k nearest line segments are obtained according to the step 3.1, a constant contrast based BOLD of each said line segment is constructed by k pairs of first angles $\alpha$ and second angles $\beta$, which form a matrix to represent the descriptor.

7. The method for grasping texture-less metal parts based on BOLD image matching according to claim 1, wherein the step 4 is performed specifically as follows:

4.1: different k values for generating the descriptors of line segments in the real image and the CAD template images are $k_1$ and $k_2$, respectively;

if $k_1 = k_2$, the Euclidean distance between the descriptor of one said line segment in the real image and the descriptor of each said line segment in the CAD template images is calculated according to the following formula, two line segments corresponding to the nearest descriptors are selected and are regarded as matched to constitute a line segment pair:

$$d = \sqrt{\sum_{i=1}^{n} (d_i^1 - d_i^2)^2}$$

wherein, d is the Euclidean distance between two descriptors, $d_i^1$ is an i-th element in the descriptor of the line segment in a first image, $d_i^2$ is an i-th element in the descriptor of the line segment in a second image, i is the ordinal of elements in the descriptor, and n is the total number of elements in the descriptor;

if $k_1 < k_2$, processing is performed as follows:

first, the descriptor of each said image is calculated and corrected according to the following formula:

$$d_i^2 = \begin{cases} 0, d_i^1 = 0 \\ d_i^2, \text{else} \end{cases}, i = 1, 2 \ldots n$$

wherein, $d_i^m$ is an element at the i-th position of the line segment in an m-th image;

then, the descriptors of all the images are normalized:

$$d_i^m = \dfrac{d_i^m}{\sqrt{\sum_{i=1}^{n} (d_i^m)^2}}, m = 1, 2$$

finally, the Euclidean distance between the descriptor of one said line segment in the real image and the descriptor of each said line segment in the CAD template images is calculated according to the following formula, and two line segments corresponding to the nearest descriptors are selected and are regarded as matched:

$$d = \sqrt{\sum_{i=1}^{n}(d_i^1 - d_i^2)^2}$$

wherein, d is the Euclidean distance between two descriptors, $d_i^1$ is an i-th element in the descriptor of the line segment in a first image, $d_i^2$ is an i-th element in the descriptor of the line segment in a second image, i is the ordinal of elements in the descriptor, and n is the total number of elements in the descriptor;

finally, in the step 4, after line segment pairs of all the line segments in the real image are found in the CAD template images, mismatches of all the line segments are removed through an RANSAC algorithm, and a finally obtained line segment pair is used as a line segment matching result.

* * * * *